United States Patent [19]

Mickiewicz

[11] Patent Number: 5,082,407

[45] Date of Patent: Jan. 21, 1992

[54] FASTENER RETAINER

[75] Inventor: Josef Mickiewicz, Farchant, Fed. Rep. of Germany

[73] Assignee: Marker Deutschland GmbH, Eschenlohe, Fed. Rep. of Germany

[21] Appl. No.: 510,163

[22] Filed: Apr. 17, 1990

[30] Foreign Application Priority Data

Apr. 28, 1989 [DE] Fed. Rep. of Germany ... 8905417[U]

[51] Int. Cl.$^5$ .............................................. F16B 39/00
[52] U.S. Cl. ................... 411/107; 411/352; 411/999
[58] Field of Search ............. 411/999, 107, 103, 337, 411/352, 516, 520, 521; 403/21

[56] References Cited

U.S. PATENT DOCUMENTS

| Re. 24,065 | 10/1955 | Bergstrom | 403/14 |
|---|---|---|---|
| 1,682,194 | 8/1928 | Selah . | |
| 2,455,891 | 12/1948 | Flanagan | 411/436 X |
| 2,761,484 | 9/1956 | Sternick et al. | 411/999 X |
| 2,929,474 | 3/1960 | Boardman | 411/999 X |
| 3,124,190 | 3/1964 | Cornell | 411/999 X |
| 3,126,935 | 3/1964 | Tuozzo | 411/999 X |
| 3,156,281 | 11/1964 | Demi | 411/999 X |
| 3,322,128 | 5/1967 | Monahan et al. | 411/918 X |
| 3,398,496 | 8/1968 | Mischke | 411/103 X |
| 3,578,799 | 5/1971 | Davis | 411/999 X |
| 3,764,957 | 10/1973 | Iversen | 411/918 X |
| 3,917,300 | 11/1975 | Salomon . | |
| 4,585,366 | 4/1986 | Uchida | 403/21 |
| 4,640,524 | 2/1987 | Sedlmair | 411/999 X |

FOREIGN PATENT DOCUMENTS

| 1900425 | 9/1964 | Fed. Rep. of Germany . | |
|---|---|---|---|
| 1937929 | 5/1966 | Fed. Rep. of Germany . | |
| 2359489 | 1/1979 | Fed. Rep. of Germany . | |
| 2208692 | 12/1972 | France . | |
| 55-4428 | 1/1980 | Japan . | |
| 728844 | 12/1969 | Netherlands | 411/361 |
| 512923 | 11/1971 | Switzerland . | |
| 570813 | 12/1975 | Switzerland . | |

*Primary Examiner*—Rodney M. Lindsey
*Attorney, Agent, or Firm*—D. Peter Hochberg; Mark Kusner; Louis J. Weisz

[57] ABSTRACT

A system for securing a threaded fastener prepositioned in a hole in a ski binding assembly that is subsequently to be connected to a ski. The system comprises an elastic fastener retainer held within the hole that causes the lower portion of the fastener to retractably extend from the hole until a force is applied to the lower end thereof. When such a force is applied, the elastic fastener retainer is temporarily deformed, accommodating retraction of the lower portion within the hole. When the force is removed, the fastener retainer reassumes its former shape, causing the lower portion to again emerge from the hole. The system allows the assembly to be initially placed anywhere on a ski surface, and thereafter, to be moved to the location of the ski's screw holes where the assembly is to be installed.

8 Claims, 2 Drawing Sheets

FASTENER RETAINER

TECHNICAL FIELD

This invention relates to the prepositioning of mounting fasteners in mountable components. More particularly, this invention relates to a device for holding fasteners, especially threaded fasteners, in components to be mounted on other components by means of such fasteners. Specifically, this invention relates to threaded fasteners that are resiliently held by retaining structure in fastener holes in the components to be mounted by means of such fasteners, for example the base plates of ski binding parts, to still other components for instance skis, the fasteners thereby being prevented from inadvertent dislodgement from the former components prior to the mounting operation. Such resiliency allows the lower end of the fasteners to extend from such holes, but to be retractable thereinto when a force is applied to their lower end.

BACKGROUND OF THE INVENTION

Ski binding assemblies are typically sold separately from the skis to which they are subsequently to be attached. The ultimate purchaser is then able to make separate purchasing decisions with respect to the binding assemblies and the skis, following which the selected binding assemblies and skis are fastened together by means of threaded fasteners. In such instances, the binding assemblies, and the threaded fasteners required for mounting them to the skis, are packaged together to facilitate the eventual mounting of the assemblies onto a purchaser's skis.

While such procedure provides a purchaser with desirable product selection flexibility, in the past it has also entailed the disadvantage that when the fasteners are preinserted into the holes of a base plate with which the bindings are associated, they sometimes become accidentally separated from the base plate, causing inconvenience both to the seller and to the purchaser.

In addition, it is sometimes necessary to temporarily position a binding base plate against a ski in a location spaced from the ultimate mounting location. In such cases, exposed extending shanks of preinserted fasteners tend to interfere with such temporary positioning making the process of installation both complicated and time-consuming.

The problem has been previously recognized, as for example, in U.S. Pat. No. 3,917,300. The solution there proposed takes the form of a holding member such as a sleeve or washer made from a deformable material that is positioned within a screw hole in the component to be mounted, a screw being partially driven thereinto. After the component is mated to a counterpart component, the screw is fully driven, connecting the components together. Such a solution, however, does not address the problem of prepositioning, however, since the end of the screw shank protrudes from the underside of the screw hole in the first mentioned component, interfering with placement of the component in any location other than over the hole in the counterpart component into which the screw is to be finally driven. Furthermore, the friction between the screw and the deformable material increases the torque that must be applied to fully drive the screw.

BRIEF DESCRIPTION OF THE INVENTION

In light of the preceding, therefore, it is a first aspect of this invention to simplify the mounting of separate components to each other.

A second aspect of this invention is to provide a retaining device in component fastener holes to secure fasteners in such holes.

A further aspect of this invention is to provide a fastener retaining device that permits the preinsertion of threaded fasteners into a component to be mounted to another component with fasteners.

Another aspect of this invention is to prevent the inadvertent separation of threaded fasteners from components with which they have been preassembled.

An additional aspect of this invention is to provide for the secure retention of threaded fasteners in ski base plates.

Yet another aspect of this invention is to permit base plates of skis containing preassembled, threaded fasteners to be positioned on a ski at a location other than the final mounting location.

A still additional aspect of this invention is to facilitate the installation of ski base plates on skis by assemblers who are prevented from seeing the mounting holes in skis to which the base plates are to be secured.

The foregoing and additional aspects of the invention are provided by a system for securing a fastener in a hole therefor in an assembly to be connected to a base component so that a portion of said fastener's lower end retractably extends from said hole, said system comprising fastener retainer means at least a part of which is held within said hole, said means retentively engaging said fastener within said hole, and said means possessing elasticity such that said lower end portion of the fastener is pushed back into said hole when the lower end of the fastener is forced against a surface of said base component, said lower end portion emerging therefrom when not so forced.

The foregoing and other aspects of the invention are provided by a system for securing a threaded fastener in a hole therefor in a base plate for ski binding parts that includes fastener retaining means comprising a cylindrically shaped hollow enclosure provided with a bottom on one end and an outwardly extending flange on the other end, said bottom having a fastener opening in the center thereof, said enclosure being held within said hole when expanded by a fastener engaged in said opening, while said flange is located outside said hole and adjacent thereto, and said fastener opening being adapted to retentively engage the threads of said fastener and hold it within said hole so that a portion of its lower end extends therefrom, said bottom and a portion of said enclosure adjacent thereto being elastically deformable so as to permit said lower end portion of said fastener to move longitudinally back into said hole to accommodate the forcing of the lower end of said fastener against the surface of the ski, and to emerge therefrom when not so forced.

The foregoing and further aspects of the invention are provided by a system for securing a threaded fastener in a hole therefore in an assembly of ski binding parts to be connected to a ski that includes fastener retainer means adapted to hold said fastener within said hole so that a portion of its lower end extends therefrom comprising: first flexible retaining means; second flexible retaining means; and elastic means, wherein said first and second retaining means are spaced apart by a distance at least as great as the distance by which said portion of said fastener's lower end extends from said hole, and said first and second retaining means comprise a plurality of flexible projections extending radially partially across said hole from the walls thereof, said elastic means and the head of said fastener both being located between said first and second retaining means, allowing said fastener to be partially retained within said hole, said elastic means being elastically deformable by the head of said fastener so as to permit said lower end portion to move longitudinally back into said hole to accommodate the forcing of the lower end of the fastener against the surface of a ski, and to emerge therefrom when not so forced.

The foregoing and still additional aspects of the invention are provided by an assembly of ski binding parts that includes mounting holes therein, said mounting holes being provided with fastener retaining means that retentively engage a mounting fastener positioned in said holes so that a portion of the lower end of the fastener extends from said holes, while the rest of the fastener is retained within said holes, said means possessing elasticity such that said lower end portion is pushed back into said hole when the lower end of the fastener is forced against the surface of the ski, said lower end portion emerging therefrom when not so forced.

BRIEF DESCRIPTION OF THE DRAWINGS

The invention will be better understand when reference is had to the following drawings, in which like-numbers refer to like-parts, and in which.

DETAILED DESCRIPTION OF THE INVENTION

Mounting or "base" plates to which ski binding parts can be attached are frequently used to mount such parts to skis. Screws are driven through holes in the base plates into counterpart mating screw holes in the skis to mount the binding parts on the skis. Advantageously, such screws are preassembled into the base plate holes at the point of manufacture in a manner allowing them to be retained therein, and then fitted to the skis at the point of sale.

Desirably, such preassembly provides positioning of the screws so that while they are retained in the base plate holes, their lower portion retractably extends from the holes, permitting their lower portion to be pushed back into the holes when the screw tips are forced against a solid ski surface, and to emerge therefrom when positioned over screw holes located in the skis.

This system is of a considerable benefit since the base plate mounting procedure frequently requires an initial contact of the plate with the ski at a location where the base plate screw holes are somewhat distant from the ski screw holes into which the base plate screws are to be installed. In such cases, the invention described herein allows the screws to be pushed back into the base plate screw holes so that the plate can be moved over the ski surface, and to emerge therefrom into the ski screw holes when the holes in both parts have been properly aligned. The system thus greatly facilitates the assembly procedure, particularly where the assembler cannot see the holes in the skis during the assembly process.

Figure 1:
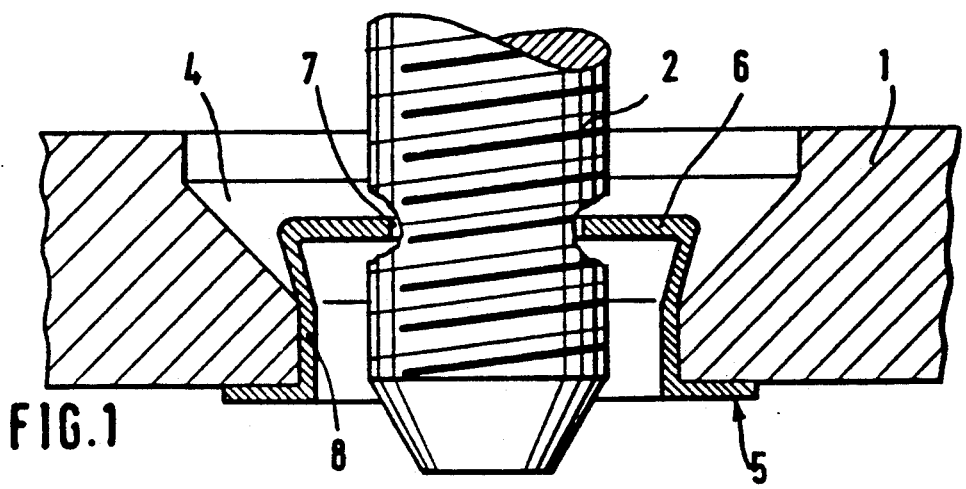
FIG. 1 is a vertical cross-section of a system embodying the concept of the invention taken through the center of a hole in which the system is installed.

Referring now to the Figures, FIG. 1 shows a cross-section of a system embodying the concept of the invention taken through the vertical center of a hole in which the system is installed. The Figure shows a ski mounting plate 1 provided with a screw hole 4 located therein. A fastener retainer, generally 5, that includes a cylindrical portion 8 and a bottom portion 6 is positioned within the screw hole 4. The bottom 6 of the fastener retainer 5 has a bottom opening 7 disposed in the center thereof, the edges of which retentively engage the threads of the screw 2. As is apparent from the Figure, insertion of the screw 2 results in the expansion of the fastener retainer 5, particularly its bottom 6 and the cylindrical portion 8 adjacent thereto, preventing the fastener from being dislodged from the bottom of the screw hole 4. At the same time, the annular flange outside and adjacent to the hole prevents the fastener retainer from being dislodged through the top of the hole 4. When no force is acting upon the lower end of the screw 2, its lower portion projects below the hole as shown. If desired, the bottom 6 may be provided with incisions radiating from the bottom opening 7 so that the bottom can better adapt itself to engagement with the screw threads. As can be seen, the system is such that the hollow cylindrical portion 8 is spaced apart from the screw 2.

Figure 2:
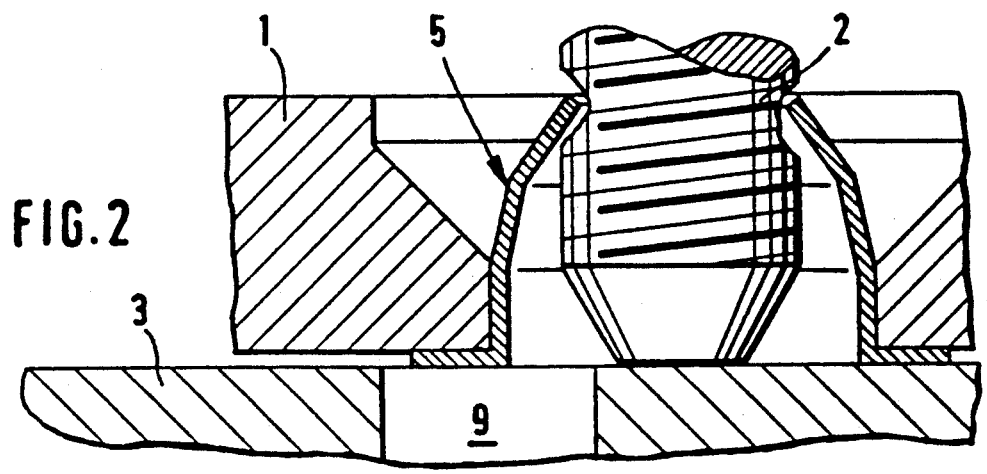
FIG. 2 is a cross-section similar to FIG. 1 in which, however, the lower end of the threaded fastener retained in the hole has been pushed back into the hole.

FIG. 2 is a cross-section similar to FIG. 1 in which, however, the lower end of the screw retained in the hole has been pushed back into the hole. The Figure represents a situation in which the mounting plate 1 has been positioned adjacent to a base 3 on which it is to be mounted, but with the screw hole 4 of the mounting plate offset relative to the screw hole 9 in the base. Such positioning results in the imposition of a force against the lower end of the screw 2 which causes it to urge against the thread-engaged edge of the opening 7 in the bottom 6 of the fastener retainer 5. Such force results in the elastic deformation of the bottom and the cylindrical portion adjacent thereto, allowing the lower portion of the screw 2 to be retracted within the hole 4 as illustrated.

Such a situation is frequently encountered in assembling a mounting plate to a ski, either because the design requires the mounting plate to be initially placed against the ski in a position other than its final position, or because the assembler cannot see the screw holes as he prepares to fasten the mounting plate. The retractability allows the mounting plate to be moved about without interference from the projecting shank of the screw until the plate has been moved to its final position.

Figure 3:
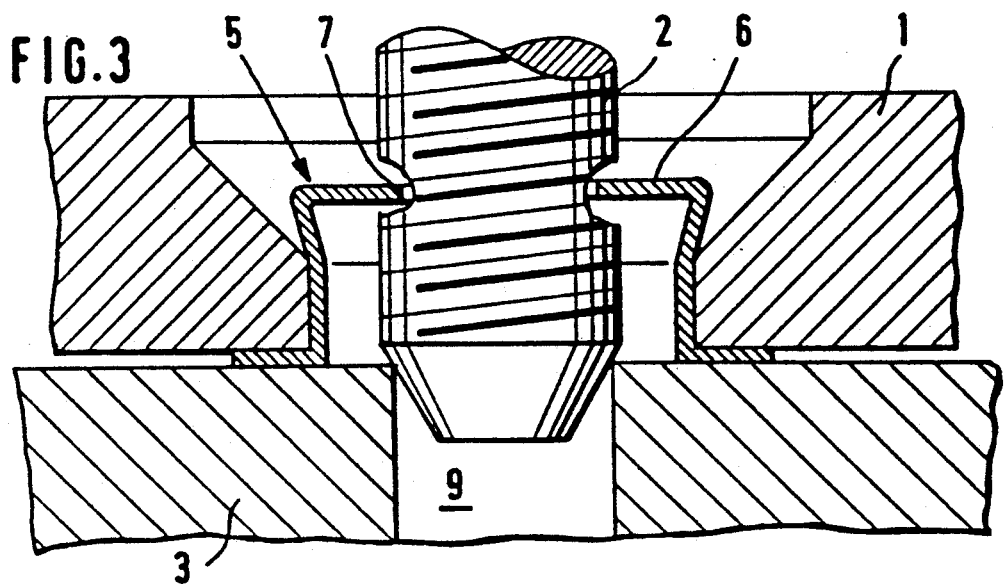
FIG. 3 is a cross-section similar to FIG. 1 in which, however, the lower end of the threaded fastener is positioned over a mating hole.

FIG. 3 is a cross-section similar to FIG. 1 in which, however, the lower portion of the screw 2 again extends from below the hole in the mounting plate. The Figure illustrates the case in which the mounting plate 1 has been relocated from its original location, as shown in FIG. 2, to its final location in which the screw hole 4 in the mounting plate 1, and the screw hole 9 in the base 3 have been properly aligned. When such alignment has been achieved, the force of the base 3 is removed from the lower end of the screw 2, allowing the elastic fastener retainer 5 to reassume its underformed condition, causing the emergence of the lower portion of the screw 2 from screw hole 4 into the screw hole 9. In such position, the screw 2 can be driven into the hole 9, securely connecting the mounting plate 1 to the base 3.

Figure 4:
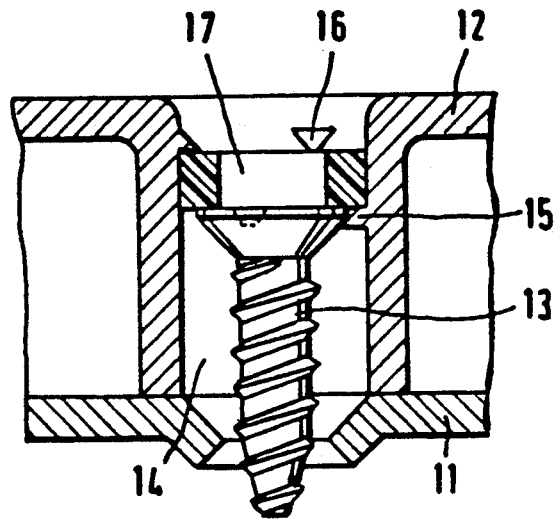
FIG. 4 is a vertical cross-section illustrating another system embodying the concept of the invention taken through the center of a hole in which the device is installed.

FIG. 4 is a vertical cross-section illustrating another system embodying the concept of the invention taken through the center of a hole in which the device is installed.

As illustrated, an assembly of ski binding parts includes a mounting plate 11 associated with a ski binding part 12 which has a screw hole 14 located therein, the hole forming a part of the overall screw hole of the assembly. The Figure shows a screw 13 with a head positioned between a series of elastic projections 15, for example three of such projections, and another similar series of elastic projections 16. The bottom of the head of the screw 13 rests on the projections 15 and has an elastic ring located on the top of its head. The distance between projections 15 and 16 is designed to provide sufficient room to accommodate retraction of the lower portion of the screw protruding from the screw hole in the assembly, back within the hole when a force is applied against the screw's lower end. Due to the elastic projections 15 and 17, the elastic ring and the head of the screw are prevented from being inadvertently dislodged from the assembly. When a force is applied to the lower end of the screw 13, the elastic ring 17 compresses, allowing the lower portion of the screw to retract within the assembly hole. When the screw 17 has been positioned over the base member on which it is to be mounted, however, the elastic ring reassumes its original uncompressed shape, forcing the tip of the screw out of the assembly hole into the hole of the base member to which the assembly is to be fastened. The screw can then be driven past the elastic projections 15, permitting the assembly and the base to be securely connected.

Figure 5:
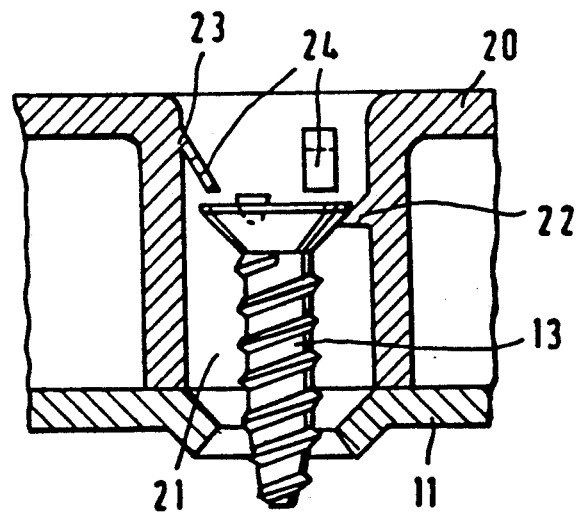
FIG. 5 is a vertical cross-section illustrating another system embodying the concept of the invention taken through the center of a hole in which the device is installed.

FIG. 5 is a vertical cross-section illustrating another system embodying the concept of the invention, again taken through the center of a hole in which the device is installed. In the Figure, an assembly of ski binding parts includes a mounting plate 11 associated with the ski binding part 20. A screw hole 21 extending through the ski binding part 20 forms a part of an overall assembly screw hole in which screw 13 is positioned between elastic projections 22 and 23. Elastic projections 23 have spring strips 24 forming a part thereof which serve the same function as the elastic ring 17 of FIG. 4. As in the case of FIG. 4, the bottom of the head of the screw 13 rests on elastic projections 22, which may be three in number, spaced around the periphery of the hole 21. The spring strips 24 of the elastic projections 23 extend between such projections and the head of the screw, allowing the elastic spring strips to apply an elastic pressure to the head of the screw when the latter is forced upwards by contact of its lower end with a ski surface. The distance between the elastic projections 22 and 23 accommodates the distance by which the screw 13 extends from the mounting plate 11, the screw being held between projections 20 and 22 until driven past elastic projections 22 into the ski.

The mounting systems of the invention may be used not only in connection with skis as described, but in other applications where the preassembly of screws in one component that is subsequently to be mounted to another component is required. In instances where the invention is used in connection with fastening ski bindings to skis, mounting plates 1 and 3 may either be the base plate of a ski binding component, or clips for retaining a part of the ski binding components to be attached.

While in accordance with the patent statutes, a preferred embodiment and best mode has been presented, the scope of the invention is not limited thereto, but rather is measured by the scope of the attached claims.

What is claimed is:

1. A system for securing a fastener in a hole therefor in an assembly to be connected to a base component so that a portion of said fastener's lower end retractably extends from said hole, said system comprising fastener retainer means at least a part of which is held within said hole, said means retentively engaging said fastener within said hole, and said means possessing axial elasticity sufficient to allow the lower end portion of the fastener to move into said hole when said lower end portion of the fastener is forced toward said hole and to cause the fastener to emerge therefrom when the force is removed and said fastener retainer means engages the threads of the fastener to provide the retentive engagement.

2. A system according to claim 1 in which said assembly is an assembly of ski binding parts and said base component is a ski.

3. A system according to claim 1 wherein said fastener retaining means comprises a cylindrically shaped, hollow enclosure provided with a bottom on one end and an outwardly extending flange on the other end, said bottom having a fastener opening in the center thereof adopted to retentively engage said fastener and to hold said enclosure within said hole when expanded by said fastener, said enclosure being located inside said hole and said flange being located outside and adjacent said hole, said bottom and the portion of said enclosure adjacent to said bottom being elastically deformable so as to permit said lower end portion of a fastener engaged in said opening to move longitudinally back into said hole to accommodate said forcing, and to emerge therefrom when said forcing is absent.

4. A system according to claim 3 wherein said bottom includes radial incisions therein.

5. A system according to claim 3 wherein said outwardly extending flange has an annular shape.

6. A system according to claim 3 in which said fastener opening is adapted to retentively engage the threads.

7. A fastener retainer for securing a threaded fastener in a hole therefor in a base plate for ski binding parts comprising a cylindrically shaped hollow enclosure provided with a bottom on one end and an outwardly extending flange on the other end, said bottom having a fastener opening in the center thereof, said enclosure being held within said hole when expanded by a fastener engaged in said opening, while said flange is located outside said hole and adjacent thereto, and said fastener opening being adapted to retentively engage the threads of said fastener and hold it within said hole so that a portion of its lower end extends therefrom, said bottom and the portion of said enclosure adjacent thereto being sufficiently elastically deformable to allow the lower end portion of the fastener to move into said hole to accommodate the forcing of the lower end of said fastener against the surface of a ski, and to cause the fastener to emerge therefrom when the force is removed.

8. An assembly of ski binding parts that includes mounting holes therein, said mounting holes being provided with fastener retaining means that retentively engage a mounting fastener positioned in said holes so that a portion of the lower end of the fastener extends from said holes, while the rest of the fastener is retained within said holes, said means possessing elasticity sufficient to allow the lower end portion of the fastener to move into said hole when the lower end of the fastener is forced against the surface of a ski, said elasticity causing the lower end portion of the fastener to emerge therefrom when the force is removed.

* * * * *